(12) United States Patent
Kim

(10) Patent No.: US 7,021,071 B2
(45) Date of Patent: Apr. 4, 2006

(54) METHOD AND APPARATUS FOR CONTROLLING COOLING FAN OF VEHICLE

(75) Inventor: Chang Hyun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/750,651

(22) Filed: Dec. 31, 2003

(65) Prior Publication Data

US 2004/0206099 A1 Oct. 21, 2004

(30) Foreign Application Priority Data

Apr. 21, 2003 (KR) ...................... 10-2003-0025108

(51) Int. Cl.
*F25D 17/00* (2006.01)
*F01P 7/02* (2006.01)

(52) U.S. Cl. .......................... 62/178; 62/133; 62/180; 62/183; 236/35; 123/41.12; 123/41.49

(58) Field of Classification Search .................. 62/133, 62/178, 180, 183; 236/35; 123/41.12, 41.49
See application file for complete search history.

(56) References Cited

U.S. PATENT DOCUMENTS

| 4,425,766 | A | * | 1/1984 | Claypole ..................... 62/133 |
| 4,546,742 | A | * | 10/1985 | Sturges ..................... 123/41.05 |
| 5,133,302 | A | * | 7/1992 | Yamada et al. ............. 128/898 |
| 5,307,644 | A | * | 5/1994 | Cummins et al. ............. 62/133 |
| 5,561,243 | A | * | 10/1996 | Machida ..................... 436/176 |
| 6,337,949 | B1 | * | 1/2002 | Muron et al. ................ 388/800 |
| 6,807,926 | B1 | * | 10/2004 | Shiozaki et al. .......... 123/41.12 |
| 2004/0016246 | A1 | * | 1/2004 | Furukawa et al. ............ 62/183 |
| 2004/0031277 | A1 | * | 2/2004 | Hirose et al. ................. 62/186 |

FOREIGN PATENT DOCUMENTS

| JP | 04-128511 | 4/1992 |
| KR | 102002009 5984 A | 12/2002 |

* cited by examiner

*Primary Examiner*—Marc Norman
(74) *Attorney, Agent, or Firm*—Morgan Lewis & Bockius LLP

(57) ABSTRACT

A driving load of a cooling fan unit is selectively determined from a plurality of predetermined loads corresponding to vehicle parameters including a coolant temperature and a vehicle speed. Also, on the basis of a plurality of coolant temperature ranges and a plurality of vehicle speed ranges. The cooling fan unit is driven with the determined driving load. The vehicle parameters preferably further include a refrigerant pressure and a state of an air/con switch.

15 Claims, 8 Drawing Sheets

FIG.2

| Air/con switch | Refrigerant pressure(P) | Vehicle speed(KPH) V | Coolant temperature(°C) -30 | 95 | 102 | 105 |
|---|---|---|---|---|---|---|
| On | P≥18kgf/cm² | ALL | Stop | High load | High load | High load |
| | 18kgf/cm² ≥P≥ 13kgf/cm² | V<45 | Stop | Low load | High load | High load |
| | | 45≤V<80 | Stop | Stop | Low load | High load |
| | | 80≤V | Stop | Stop | Stop | High load |
| | 13kgf/cm² >P | V<45 | Stop | Low load | High load | High load |
| | | 45≤V<80 | Stop | Stop | Low load | High load |
| | | 80≤V | Stop | Stop | Stop | High load |
| Off | | V<45 | Stop | Stop | Low load | High load |
| | | 45≤V<80 | Stop | Stop | Low load | High load |
| | | 80≤V | Stop | Stop | Stop | High load |
| Non-equipped | | V<45 | Stop | Stop | High load | High load |
| | | 45≤V<80 | Stop | Stop | High load | High load |
| | | 80≤V | Stop | Stop | Stop | High load |

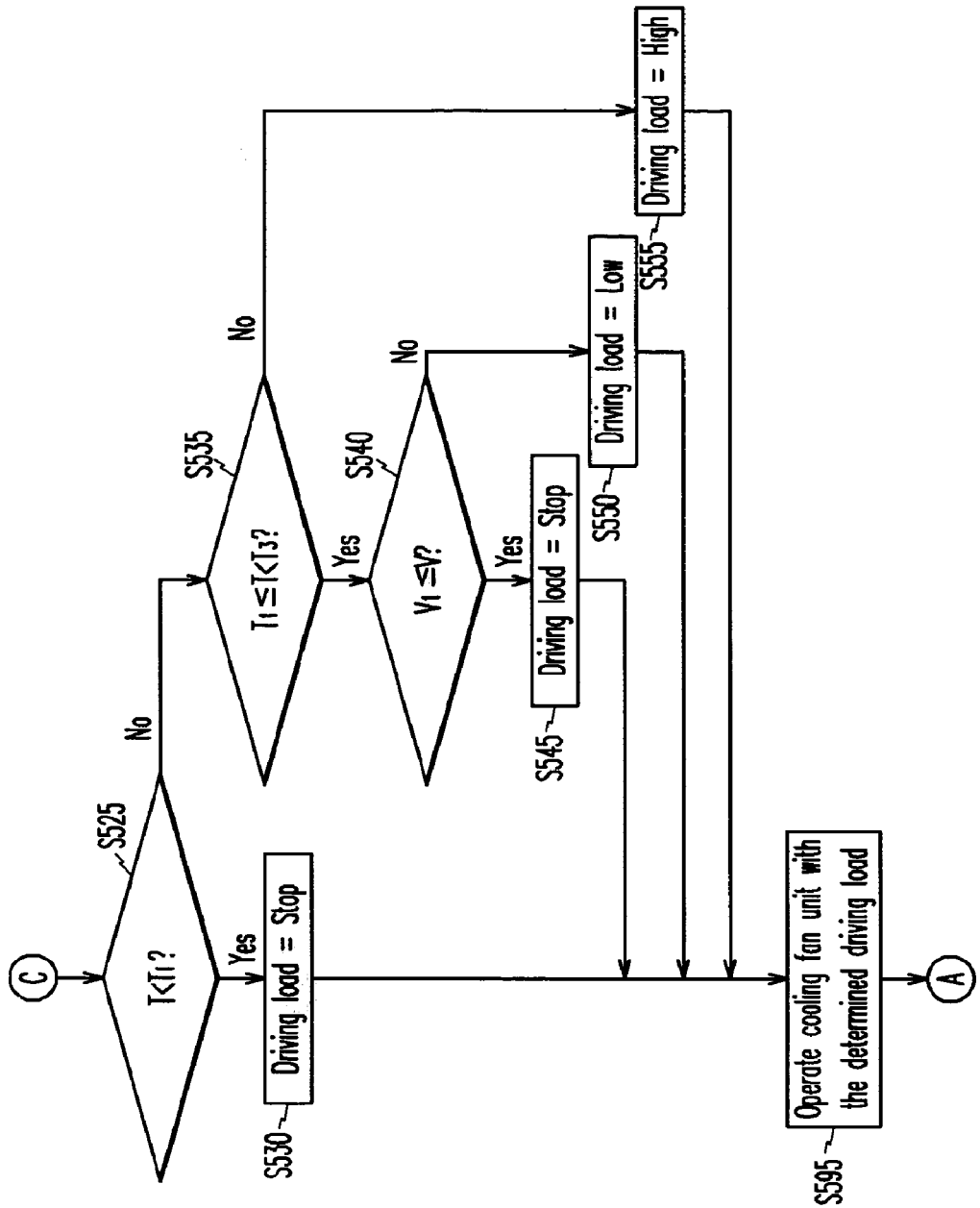

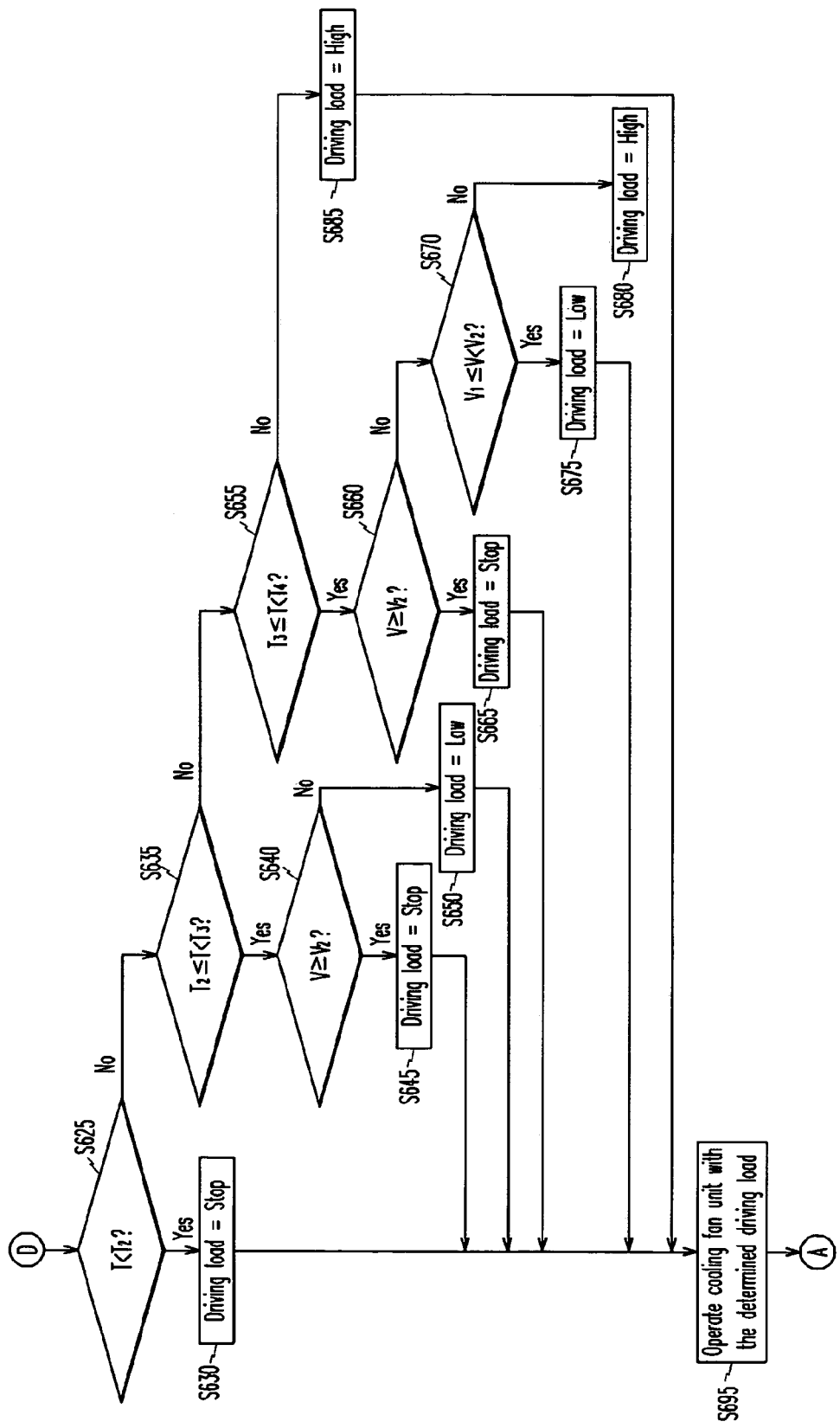

METHOD AND APPARATUS FOR CONTROLLING COOLING FAN OF VEHICLE

CROSS-REFERENCE TO RELATED APPLICATIONS

This application claims priority of Korean Application No. 10-2003-0025108, filed Apr. 21, 2003, the disclosure of which is incorporated fully herein by reference.

FIELD OF THE INVENTION

Generally, the present invention relates to a method and apparatus for controlling a cooling fan of a vehicle. More particularly, the present invention relates to a method and apparatus for optimally controlling a cooling fan of a vehicle in a variety of vehicle running states.

BACKGROUND OF THE INVENTION

Typically, a vehicle is equipped with a radiator to exhaust heat generated by an engine. A cooling fan is mounted to the radiator so heat is expelled therefrom by active blowing of air. When a vehicle is equipped with an air conditioning system (referred to as "air/con" hereinafter), a condenser is disposed in the vicinity of the radiator for condensing refrigerant and for radiating heat therefrom. An additional cooling fan is provided for enhancing heat radiation of both of the radiator and the condenser.

For stable running of the vehicle, the one or more cooling fans should be properly controlled in accordance with a running state of the vehicle. Therefore, research has been undertaken for determining an optimal controlling of the cooling fan in accordance with variable running states of the vehicle. For example, such a cooling fan can be controlled on and off according to a coolant temperature of an engine.

As a further development, as is described in Laid Open Korean patent publication 2002-80980, the cooling fan can be controlled according to a temperature of a cabin room of a vehicle. Further information regarding controlling of a cooling fan of a vehicle can be found in Laid Open Korean patent publications 2000-21773 and 2002- 93393. If a cooling fan can be better controlled in accordance with a running state of a vehicle than as yet known in the art, more stable operation of an engine and more stable running of the vehicle can be achieved.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

An embodiment of the present invention provides a method and apparatus for controlling at least one cooling fan of a vehicle with stableness in engine operation and vehicle running.

An embodiment of the apparatus for controlling a cooling fan unit of a vehicle includes a coolant temperature detector for detecting a coolant temperature and a vehicle speed detector for detecting a vehicle speed. The apparatus also includes a controller for controlling the cooling fan unit at least on the basis of the coolant temperature and the vehicle speed. The controller executes instructions for a method according to the present invention.

According to another embodiment a method for controlling a cooling fan unit of a vehicle includes detecting a plurality of vehicle parameters including a coolant temperature and a vehicle speed, determining a driving load of the cooling fan unit corresponding to the vehicle parameters, and operating the cooling fan unit at the determined driving load. The driving load is selectively determined from a plurality of predetermined loads on the basis of a plurality of temperature ranges of the coolant temperature and a plurality of vehicle speed ranges.

In a further embodiment, the plurality of temperature ranges are formed by at least one reference temperature selected from a plurality of predetermined temperatures. Also, the plurality of speed ranges are formed by at least one reference speed selected from a plurality of predetermined speeds.

In a yet further embodiment, the vehicle is equipped with an air conditioning system including an air/con switch, and the at least one reference temperature and the at least one reference speed are selected on the basis of an on/off state of the air/con switch.

In a yet further embodiment, the at least one reference temperature and the at least one reference speed are selected on the basis of an on/off state of the air/con switch and a refrigerant pressure in the air conditioning system.

It is preferable that, in the case in which the air/con switch is off, the determining the driving load of the cooling fan unit determines the driving load as a smallest one of the predetermined loads when the coolant temperature lies in a first temperature range less than a first reference temperature. A load depending on comparison of the vehicle speed and a first reference speed when the coolant temperature lies in a second temperature range greater than or equal to the first reference temperature and less than a second reference temperature. A load depending on comparison of the vehicle speed and a second reference speed when the coolant temperature lies in a third temperature range greater than or equal to the second reference temperature and less than a third reference temperature. Also, a largest one of the predetermined loads when the coolant temperature lies in a fourth temperature range greater than or equal to the third reference temperature. In this case, it is preferable that the first reference temperature is less than 100° C., and the second reference temperature and the third reference temperature are greater than 100° C. In this case, it is also preferable that the first reference speed is smaller than the second reference speed.

In another further embodiment, in the case in which the air/con switch is on and the refrigerant pressure lies in a range less than a first predetermined pressure and greater than or equal to a second predetermined pressure, the determining the driving load of the cooling fan unit determines the driving load as a smallest one of the predetermined loads when the coolant temperature lies in a first temperature range less than a first reference temperature. A load depending on comparison of the vehicle speed and a first reference speed when the coolant temperature lies in a second temperature range greater than or equal to the first reference temperature and less than a second reference temperature. A load depending on comparison of the vehicle speed and a second reference speed when the coolant temperature lies in a third temperature range greater than or equal to the second reference temperature and less than a third reference temperature. Also, a largest one of the predetermined loads when the coolant temperature lies in a fourth temperature range greater than or equal to the third reference temperature. In this case, it is preferable that the first reference temperature is less than 0° C., the second reference temperature is greater than or equal to 0° C. and less than 100° C., and the third reference temperature is greater than 100° C. In this case, it is preferable that the first reference speed is greater than the second reference speed.

In another further embodiment, in the case in which the air/con switch is on and the refrigerant pressure is less than a predetermined pressure, the determining the driving load of the cooling fan unit determines the driving load as a smallest one of the predetermined loads when the coolant temperature lies in a first temperature range less than a first reference temperature. A load depending on comparison of the vehicle speed and a first reference speed when the coolant temperature lies in a second temperature range greater than or equal to the first reference temperature and less than a second reference temperature. Also, a largest one of the predetermined loads when the coolant temperature lies in a third temperature range greater than or equal to the second reference temperature. In this case, it is preferable that the first reference temperature is less than 0° C., and the second reference temperature is greater than 100° C.

In another further embodiment, in the case in which the air/con switch is on and the refrigerant pressure is greater than or equal to a predetermined pressure, the determining the driving load of the cooling fan unit determines the driving load as a smallest one of the predetermined loads when the coolant temperature is less than a first reference temperature. A largest one of the predetermined loads when the coolant temperature is greater than or equal to the first reference temperature. In this case, it is preferable that the reference temperature is less than 0° C.

In another further embodiment, the at least one reference temperature and the at least one reference speed are selected on the basis of whether the vehicle is equipped with an air conditioning system. In this case, it is preferable that, in the case in which the vehicle is not equipped with an air conditioning system, the determining the driving load of the cooling fan unit determines the driving load as a smallest one of the predetermined loads when the coolant temperature lies in a first temperature range less than a first reference temperature. A load depending on comparison of the vehicle speed and a first reference speed when the coolant temperature lies in a second temperature range greater than or equal to the first reference temperature and less than a second reference temperature. Also, a largest one of the predetermined loads when the coolant temperature lies in a third temperature range greater than or equal to the second reference temperature.

In another further embodiment, an exemplary method according to an embodiment of the present invention further includes determining whether a detected vehicle parameter is abnormal, and the determining the driving load of the cooling fan unit determines the driving load on the basis of whether a vehicle parameter is abnormal and which vehicle parameter is abnormal.

In this case, it is preferable that, in the case in which the vehicle speed is abnormal, the determining the driving load of the cooling fan unit determines the driving load using a value less than the first predetermined speed as the vehicle speed.

It is also preferable that, in the case in which the coolant temperature is abnormal, the determining the driving load of the cooling fan unit determines the driving load as the largest one of the predetermined loads.

It is also preferable that the vehicle is equipped with an air conditioning system including an air/con switch, and that the vehicle parameters further include a refrigerant pressure of the air conditioning system. In the case in which the refrigerant pressure is abnormal, the determining the driving load of the cooling fan unit determines the driving load as a smallest one of the predetermined loads when the coolant temperature lies in a first temperature range less than a first reference temperature. A load depending on comparison of the vehicle speed and a first reference speed when the coolant temperature lies in a second temperature range greater than or equal to the first reference temperature and less than a second reference temperature. A load depending on comparison of the vehicle speed and a second reference speed when the coolant temperature lies in a third temperature range greater than or equal to the second reference temperature and less than a third reference temperature. Also, a largest one of the predetermined loads when the coolant temperature lies in a fourth temperature range greater than or equal to the third reference temperature.

BRIEF DESCRIPTION OF THE DRAWINGS

The accompanying drawings, which are incorporated in and constitute a part of the specification, illustrate an embodiment of the invention, and, read together with the description, serve to explain the principles of the invention in which:

FIG. 2 is a table showing a control pattern for each running state of a vehicle that is realized in a method for controlling a cooling fan of a vehicle according to an embodiment of the present invention;

FIG. 3C is a flowchart for showing a process for controlling a cooling fan in a method for controlling a cooling fan of a vehicle according to an embodiment of the present invention, especially when a refrigerant pressure is less than a second first predetermined pressure;

FIG. 3D is a flowchart for showing a process for controlling a cooling fan in a method for controlling a cooling fan of a vehicle according to an embodiment of the present invention, especially when an air/con switch is turned off;

DETAILED DESCRIPTION OF PREFERRED EMBODIMENTS

Figure 1:
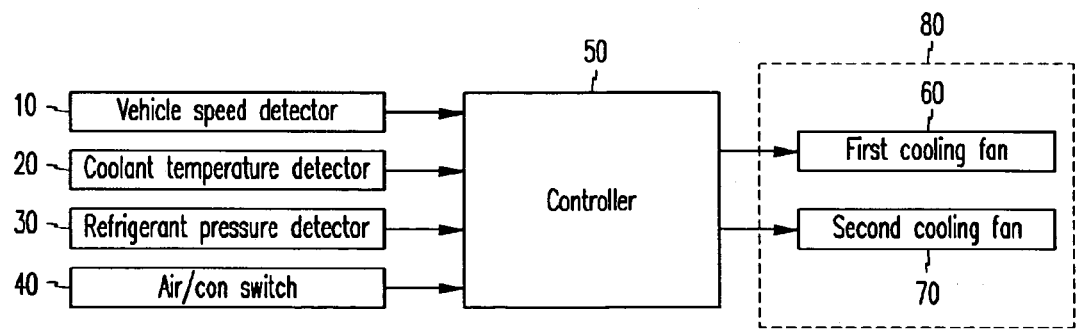
FIG. 1 is a block diagram showing an apparatus for controlling a cooling fan of a vehicle according to an embodiment of the present invention.

According to FIG. 1, an apparatus for controlling a cooling fan of a vehicle controls at least one of cooling fans 60 and 70. The apparatus of this embodiment includes a vehicle speed detector 10, a coolant temperature detector 20, a refrigerant pressure detector 30, an air/con switch (i.e., an air conditioning operation switch) 40, and a controller 50. In FIG. 1, the cooling fan unit 80 is shown as including two cooling fans, i.e., first and second cooling fans 60 and 70. However the scope of the present invention should not be understood to be limited to the number of cooling fans. The spirit of the present invention may be applied to a case in which the cooling fan unit 80 includes only one cooling fan or more than 2.

The vehicle speed detector 10 detects a current running speed (i.e., vehicle speed V) of the vehicle and sends it to the controller 50. In the case in which the vehicle is equipped with a manual transmission, a conventional sensor that detects a rotation speed of a transfer driven gear of the manual transmission can be used as the vehicle speed detector 10. In the case in which the vehicle is equipped with an automatic transmission, a conventional PG-B (pulse generator-B) sensor can be used as the vehicle speed detector 10.

The coolant temperature detector 20 detects a temperature of a coolant (i.e., coolant temperature T) for cooling of an engine (not shown) and sends it to the controller 50. The refrigerant pressure detector 30 detects a compression pressure of a refrigerant (referred to as a refrigerant pressure P hereinafter) when the air/con is operated and sends it to the controller 50. The air/con switch 40 detects an on/off signal regarding operation of the air/con (or including interior temperature of the vehicle), and sends it to the controller 50. The controller 50 controls operation of the cooling fans 60 and 70 on the basis of information obtained by the detectors 10, 20, and 30.

A control pattern of the cooling fan unit 80 according to an embodiment of the present invention is hereinafter described in detail with reference to FIG. 2, with respect to each running state of a vehicle. FIG. 2 is a table showing a control pattern for each running state of a vehicle that is realized in a method for controlling a cooling fan of a vehicle according to an embodiment of the present invention. According to an embodiment of the present invention, first and second predetermined speeds V1 and V2 (e.g., V1=45 Km/h, V2=80 Km/h) are used as reference speeds for differentiating a plurality of vehicle speed ranges.

In addition, reference temperatures for differentiating a plurality of temperature ranges are chosen from first, second, third, and fourth predetermined temperatures T1, T2, T3, and T4 (e.g., T1=−30° C., T2=95° C., T3=102° C., T4=105° C.) in accordance with each running state of the vehicle. Such a choice for reference temperatures at each running state is described below. When the coolant temperature T is less than the first predetermined temperature T1, the cooling fan unit 80 is always controlled to remain stopped. When the air/con switch 40 is turned on, the cooling fan unit 80 is controlled dependent on the refrigerant pressure P.

Firstly, a control pattern of the cooling fan unit 80 for a case in which the refrigerant pressure P is greater than or equal to a first predetermined pressure P1 (e.g., 18 kgf/cm$^2$) is explained in detail hereinafter. In this case, when the coolant temperature T is less than the first predetermined temperature T1, the cooling fan unit 80 is controlled to remain stopped as was described above. To the contrary, when the coolant temperature T is greater than or equal to the first predetermined temperature T1, the cooling fan unit 80 is driven with a high load, e.g., by simultaneously operating the first; and second cooling fans 60 and 70. That is, in this case, the first predetermined temperature T1 becomes a reference temperature to form a plurality of temperature ranges.

Next, a control pattern of the cooling fan unit 80 for a case in which the refrigerant pressure P is less than the first predetermined pressure P1 and greater than or equal to a second first predetermined pressure P2 (e.g., 18 kgf/cm$^2$>P≧13 kgf/cm$^2$) is explained in detail hereinafter. In this case, a control pattern of the cooling fan unit 80 is dependent on the vehicle speed V. In this case, the first, second, and third predetermined temperatures T1, T2, and T3 become reference temperatures to form a plurality of temperature ranges.

When the vehicle speed V is less than the first predetermined speed V1, (1) in the case in which the coolant temperature T is less than the first predetermined temperature T1, the two cooling fans 60 and 70 of the cooling fan unit 80 are controlled to remain stopped as described above; (2) in the case in which the coolant temperature T is not less than the first predetermined temperature T1 but is less than the third predetermined temperature T3, the cooling fan unit 80 is driven with a low load by operating a selective one of the first and second cooling fans 60 and 70; and (3) in the case in which the coolant temperature T is not less than the third predetermined temperature T3, the cooling fan unit 80 is driven with a high load by simultaneously operating the cooling fans 60 and 70.

When the vehicle speed V is not less than the first predetermined speed V1 but is less than the second predetermined speed V2, (1) in the case in which the coolant temperature T is less than the first predetermined temperature T1, the two cooling fans 60 and 70 of the cooling fan unit 80 are controlled to remain stopped as described above; (2) in the case in which the coolant temperature T is not less than the first predetermined temperature T1 but is less than the second predetermined temperature T2, the two cooling fans 60 and 70 of the cooling fan unit 80 are controlled to remain stopped; (3) in the case in which the coolant temperature T is not less than the second predetermined temperature T2 but is less than the third predetermined temperature T3, the cooling fan unit 80 is driven with a low load by operating a selective one of the first and second cooling fans 60 and 70; and (4) in the case in which the coolant temperature T is not less than the third predetermined temperature T3, the cooling fan unit 80 is driven with a high load by simultaneously operating the cooling fans 60 and 70.

When the vehicle speed V is greater than or equal to the second predetermined speed V2, (1) in the case in which the coolant temperature T is less than the first predetermined temperature T1, the two cooling fans 60 and 70 of the cooling fan unit 80 are controlled to remain stopped as described above; (2) in the case in which the coolant temperature T is not less than the first predetermined temperature T1 but is less than the third predetermined temperature T3, again, the two cooling fans 60 and 70 of the cooling fan unit 80 are controlled to remain stopped; and (3) in the case in which the coolant temperature T is not less than the third predetermined temperature T3, the cooling fan unit 80 is driven with a high load by simultaneously operating the cooling fans 60 and 70.

Subsequently, a control pattern of the cooling fan unit 80 for a case in which the refrigerant pressure P is less than the second first predetermined pressure P2 is explained in detail hereinafter. In this case, a control pattern of the cooling fan unit 80 is dependent on the vehicle speed V. In this case, the first and third predetermined temperatures T1 and T3 become reference temperatures to form a plurality of temperature ranges.

When the vehicle speed V is less than the first predetermined speed V1, (1) in the case in which the coolant temperature T is less than the first predetermined temperature T1, the two cooling fans 60 and 70 of the cooling fan unit 80 are controlled to remain stopped as-described above; (2) in the case in which the coolant temperature T is not less than the first predetermined temperature T1 but is less than the third predetermined temperature T3, the cooling fan unit 80 is driven with a low load by operating a selective one of the first and second cooling fans 60 and 70; and (3) in the case in which the coolant temperature T is greater than or equal to the third predetermined temperature T3, the cooling fan unit 80 is driven with a high load by simultaneously operating the cooling fans 60 and 70.

When the vehicle speed V is not less than the first predetermined speed V1 but is less than the second predetermined speed V2, (1) in the case in which the coolant temperature T is less than the first predetermined temperature T1, the two cooling fans 60 and 70 of the cooling fan unit 80 are controlled to remain stopped as described above; (2) in the case in which the coolant temperature T is not less than the first predetermined temperature T1 but is less than the third predetermined temperature T3, the two cooling fans 60 and 70 of the cooling fan unit 80 are controlled to remain stopped; and (3) in the case in which the coolant temperature T is greater than or equal to the third predetermined temperature T3, the cooling fan unit 80 is driven with a high load by simultaneously operating the cooling fans 60 and 70.

When the vehicle speed V is greater than or equal to the second predetermined speed V2, (1) in the case in which the coolant temperature T is less than the first predetermined temperature T1, the two cooling fans 60 and 70 of the cooling fan unit 80 are controlled to remain stopped as described above; (2) in the case in which the coolant temperature T is not less than the first predetermined temperature T1 but is less than the third predetermined temperature T3, the two cooling fans 60 and 70 of the cooling fan unit 80 are controlled to remain stopped; and (3) in the case in which the coolant temperature T is greater than or equal to the third predetermined temperature T3, the cooling fan unit 80 is driven with a high load by simultaneously operating the cooling fans 60 and 70.

In the above, control patterns of the cooling fan unit 80 are explained with respect to cases in which the air/con switch 40 is turned on, and hereinafter, a control pattern for a case in which the air/con switch 40 is turned off is explained in detail. In this case, controlling of the cooling fan unit 80 depends only on the vehicle speed V and the coolant temperature T. In this case, the second, third, and fourth predetermined temperatures T2, T3, and T4 become reference temperatures to form a plurality of temperature ranges.

When the vehicle speed V is less than the first predetermined speed V1, (1) in the case in which the coolant temperature T is less than the first predetermined temperature T1, the two cooling fans 60 and 70 of the cooling fan unit 80 are controlled to remain stopped as described above; (2) in the case in which the coolant temperature T is not less than the first predetermined temperature T1 but is less than the second predetermined temperature T2, the two cooling fans 60 and 70 of the cooling fan unit 80 are controlled to remain stopped; (3) in the case in which the coolant temperature T is not less than the second predetermined temperature T2 but is less than the third predetermined temperature T3, the cooling fan unit 80 is driven with a low load by operating a selective one of the first and second cooling fans 60 and 70; and (4) in the case in which the coolant temperature T is greater than or equal to the third predetermined temperature T3, the cooling fan unit 80 is driven with a high load by simultaneously operating the cooling fans 60 and 70.

When the vehicle speed V is not less than the first predetermined speed V1 but is less than the second predetermined speed V2, (1) in the case in which the coolant temperature T is less than the first predetermined temperature T1, the two cooling fans 60 and 70 of the cooling fan unit 80 are controlled to remain stopped as described above; (2) in the case in which the coolant temperature T is not less than the first predetermined temperature T1 but is less than the second predetermined temperature T2, the two cooling fans 60 and 70 of the cooling fan unit 80 are controlled to remain stopped; (3) in the case in which the coolant temperature T is not less than the second predetermined temperature T2 but is less than the fourth predetermined temperature T4, the cooling fan unit 80 is driven with a low load by operating a selective one of the first and second cooling fans 60 and 70; and (4) in the case in which the coolant temperature T is greater than or equal to the fourth predetermined temperature T4, the cooling fan unit 80 is driven with a high load by simultaneously operating the cooling fans 60 and 70.

When the vehicle speed V is greater than or equal to the second predetermined speed V2, the same as when the vehicle speed V is not less than the first predetermined speed V1 but is less than the second predetermined speed V2, (1) in the case in which the coolant temperature T is less than the first predetermined temperature T1, the two cooling fans 60 and 70 of the cooling fan unit 80 are controlled to remain stopped as described above; (2) in the case in which the coolant temperature T is not less than the first predetermined temperature T1 but is less than the fourth predetermined temperature T4, the two cooling fans 60 and 70 of the cooling fan unit 80 are controlled to remain stopped; and (3) in the case in which the coolant temperature T is greater than or equal to the fourth predetermined temperature T4, the cooling fan unit 80 is driven with a high load by simultaneously operating the cooling fans 60 and 70.

In the above, control patterns of the cooling fan unit 80 were explained with respect to-cases in which the vehicle is equipped with an air/con system, and hereinafter a control pattern for a case in which the vehicle is not equipped with an air/con system is explained in detail. In this case, the refrigerant is not provided in the vehicle, so the controlling of the cooling fan unit 80 depends only on the vehicle speed V and the coolant temperature T. In addition, a vehicle is usually provided with only one cooling fan (e.g., cooling fan 60) when an air conditioning system is not provided therewith. Therefore, in this case, the object that is controlled according to an embodiment of the present invention is only the first cooling fan 60. In this case, the second and fourth predetermined temperatures T2 and T4 become reference temperatures to form a plurality of temperature ranges.

When the vehicle speed V is less than the first predetermined speed V1, (1) in the case in which the coolant temperature T is less than the first predetermined temperature T1, the cooling fan 60 of the cooling fan unit 80 is controlled to remain stopped as was described above; (2) in the case in which the coolant temperature T is not less than the first predetermined temperature T1 but is less than the second predetermined temperature T2, again, the cooling fan 60 of the cooling fan unit 80 is controlled to remain stopped; and (3) in the case in which the coolant temperature T is greater than or equal to the second predetermined temperature T2, the cooling fan unit 80 is driven with a high load by operating the first cooling fan 60 with a high load.

When the vehicle speed V is not less than the first predetermined speed V1 but is less than the second predetermined speed V2, the same as when the vehicle speed V is less than the first predetermined speed V1, (1) in the case in which the coolant temperature T is less than the first predetermined temperature T1, the cooling fan 60 of the cooling fan unit 80 is controlled to remain stopped as was described above; (2) in the case in which the coolant temperature T is not less than the first predetermined temperature T1 but is less than the second predetermined temperature T2, again, the cooling fan 60 of the cooling fan unit 80 is controlled to remain stopped; and (3) in the case in which the coolant temperature T is greater than or equal to the second predetermined temperature T2, the cooling fan unit 80 is driven with a high load by operating the first cooling fan 60 with a high load.

When the vehicle speed V is not less than the second predetermined speed V2, (1) in the case in which the coolant temperature T is less than the first predetermined temperature T1, the cooling fan 60 of the cooling fan unit 80 is controlled to remain stopped as was described above; (2) in the case in which the coolant temperature T is not less than the first predetermined temperature T1 but is less than the fourth predetermined temperature T4, again, the cooling fan 60 of the cooling fan unit 80 is controlled to remain stopped; and (3) in the case in which the coolant temperature T is greater than or equal to the fourth predetermined temperature T4, the cooling fan unit 80 is driven with a high load by operating the first cooling fan 60 with a high load.

Figure 3A:
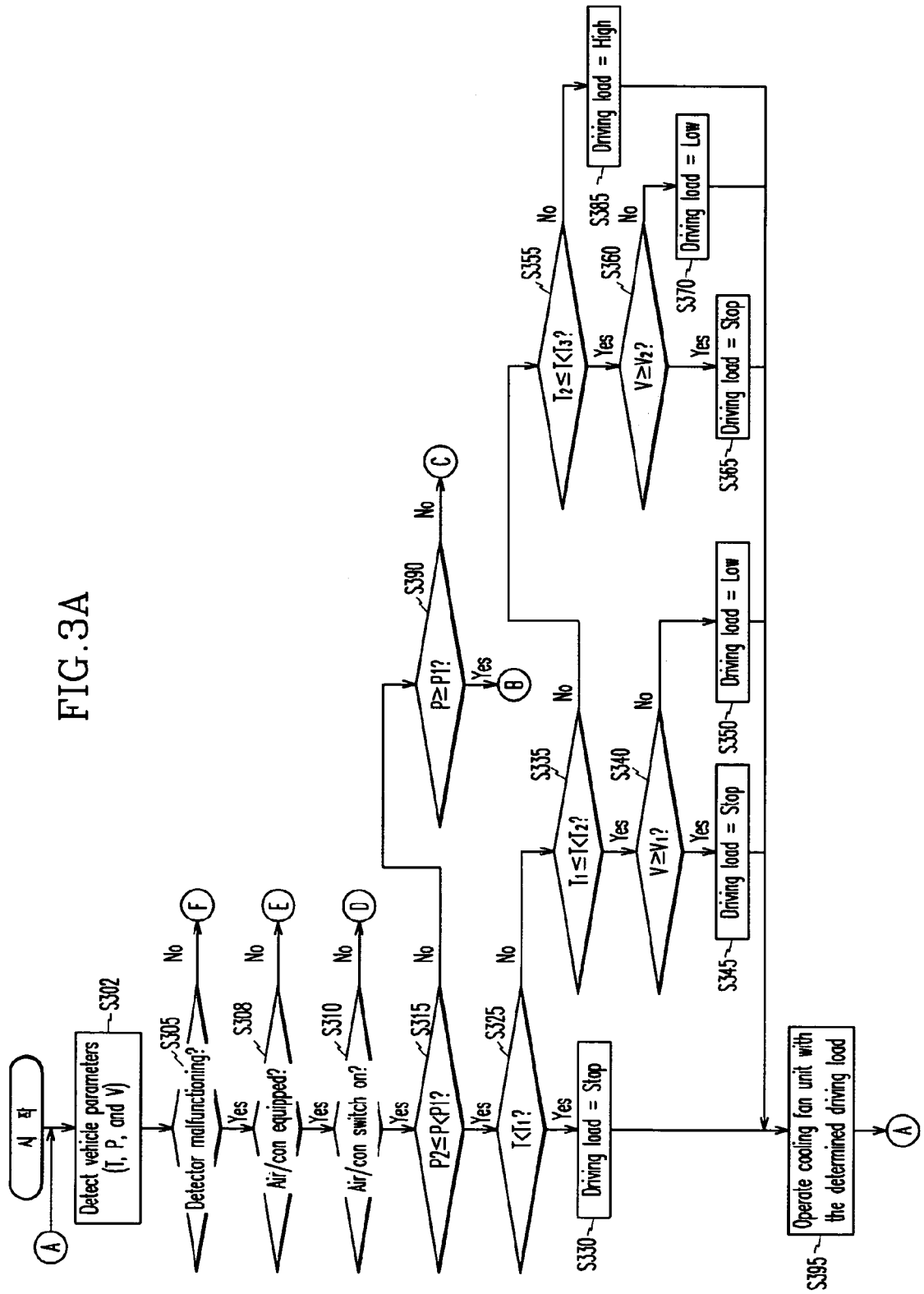
FIG. 3A is a flowchart for showing a method for controlling a cooling fan of a vehicle according to an embodiment of the present invention, the flowchart mainly relating to the case in which a refrigerant pressure is less than a first predetermined pressure and greater than or equal to a second first predetermined pressure.

A method for controlling a cooling fan according to an embodiment of the present invention is hereinafter described in detail with reference to FIGS. 3A to 3F. FIG. 3A is a flowchart for showing a method for controlling a cooling fan of a vehicle according to an embodiment of the present invention, the flowchart mainly relating to the case in which the refrigerant pressure P is less than a first predetermined pressure and greater than or equal to a second first predetermined pressure. As shown in FIG. 3A, when an engine of a vehicle is started, the controller 50 detects information regarding a running state of the vehicle, that is, information regarding the vehicle speed V, the coolant temperature T, and the refrigerant pressure P at step S302, and at the step S305 the controller 50 determines if any detector 10, 20, or 30 malfunctions.

A malfunction of a detector may be determined on the basis of whether an output signal of the detector lies within a predetermined permitted range. Processes that are executed when any detector is determined to malfunction at the step S305 are described later in detail with reference to FIG. 3F.

When all detectors 10, 20, and 30 are found to function normally at the step S305, the controller 50 determines at step S308 whether the vehicle is equipped with an air conditioning system. The existence of an air conditioning system may be determined on the basis of, e.g., whether an air/con switch is provided to the vehicle, i.e., whether a signal is received from an air/con switch. Processes that are executed when the vehicle is not equipped with an air conditioning system are described later in detail with reference to FIG. 3E.

When the vehicle is equipped with an air conditioning system, the controller 50 determines at step S310 whether an air/con switch 40 is turned on. Processes that are executed when the air/con switch 40 is not turned on, i.e., when the air/con switch 40 remains at an off state, are described later in detail with reference to FIG. 3D. When the air/con switch 40 is turned on, the controller 50 determines at step S315 whether the refrigerant pressure P of the air conditioning system is greater than or equal to the second first predetermined pressure P2 and less than the first predetermined pressure P1.

When the refrigerant pressure P does not lie in the range of the second first predetermined pressure P2 to the first predetermined pressure P1, the controller 50 determines at step S390 whether the refrigerant pressure P is greater than or equal to the first predetermined pressure P1. Processes that are executed when the refrigerant pressure P is greater than or equal to the first predetermined pressure P1 at the step S390 are described later in detail with reference to FIG. 3B.

In addition, processes that are executed when the refrigerant pressure P is found to be not greater or equal to the first predetermined pressure P1 at the step S390 (that is, when the refrigerant pressure P is less than the second first predetermined pressure P2) are described later in detail with reference to FIG. 3C.

Hereinafter, processes regarding the case in which the refrigerant pressure P lies in the range of the second first predetermined pressure P2 to the first predetermined pressure P1 (S315-yes) are described in detail.

Firstly at step S325, the controller 50 determines whether the coolant temperature T is less than the first predetermined temperature T1, and then at step S330, it determines to stop the cooling fan unit 80 in the case in which the coolant temperature T is less than the first predetermined temperature T1.

When the coolant temperature T is not less than the first predetermined temperature T1 at step S325, the controller 50 determines at step S335 whether the coolant temperature T lies in a range greater than or equal to the first predetermined temperature T1 and less than the second predetermined temperature T2.

When the coolant temperature T lies in the range greater than or equal to the first predetermined temperature T1 and less than the second predetermined temperature T2, the controller 50 determines at step S340 whether the vehicle speed V is greater than or equal to the first predetermined speed V1.

When the vehicle speed V is greater than or equal to the first predetermined speed V1, the controller 50 determines to stop the cooling fan unit 80 at step S345. When the vehicle speed V is less than the first predetermined speed V1, the: controller 50 determines to operate the cooling fan unit 80 with a low load at step S350.

The operation of the cooling fan unit 80 with a low load may be realized by operating only a part of the cooling fans included in the cooling fan unit 80. As an example, one cooling fan (e.g., the cooling fan 60) of the two cooling fans 60 and 70 may be operated to realize such a low load operation of the cooling fan unit 80. Alternatively, when the rotation speed of the cooling fans can be controlled, the rotation speed may be changed to low to realize such a low load operation of the cooling fan unit 80.

Referring back to the step S335, when the coolant temperature T does not lie in the range greater than or equal to the first predetermined temperature T1 and less than the second predetermined temperature T2, the controller 50 determines at step S355 whether the coolant temperature T lies in a range greater than or equal to the second predetermined temperature T2 and less than the third predetermined temperature T3.

When the coolant temperature T lies in the range greater than or equal to the second predetermined temperature T2 and less than the third predetermined temperature T3, the controller 50 determines at step S360 whether the vehicle speed V is greater than or equal to the second predetermined speed V2.

When the vehicle speed V is greater than or equal to the second predetermined speed V2, the controller 50 determines to stop the cooling fan unit 80 at step S365. When the vehicle speed V is less than the second predetermined speed V2, the controller 50 determines to operate the cooling fan unit 80 with a low load at step S370.

Referring back to the step S355, when the coolant temperature T does not lie in the range greater than or equal to the second predetermined temperature T2 and less than the third predetermined temperature T3, that is, when the coolant temperature T is greater than or equal to the third predetermined temperature T3, the controller 50 determines to operate the cooling fan unit 80 with a high load at step S385.

The operation of the cooling fan unit 80 with a high load may be realized by operating all the cooling fans included in the cooling fan unit 80. Alternatively, when the rotation speed of the cooling fans can be controlled, the rotation speed may be changed to high to realize such a high load operation of the cooling fan unit 80.

When a driving load of the cooling fan unit 80 is determined (i.e., as one of "stop", "low load", and "high load") according to the coolant temperature T and the vehicle speed V at steps S330, S345, S350, S365, S370, and S385, the controller 50 operates the cooling fan unit 80 with such determined driving load at step S395.

Subsequently, the controller 50 proceeds to the step S302, so the controlling state of the cooling fan unit 80 can remain optimal in accordance with a running state of the vehicle even though the running state may change while the vehicle is running.

Figure 3B:
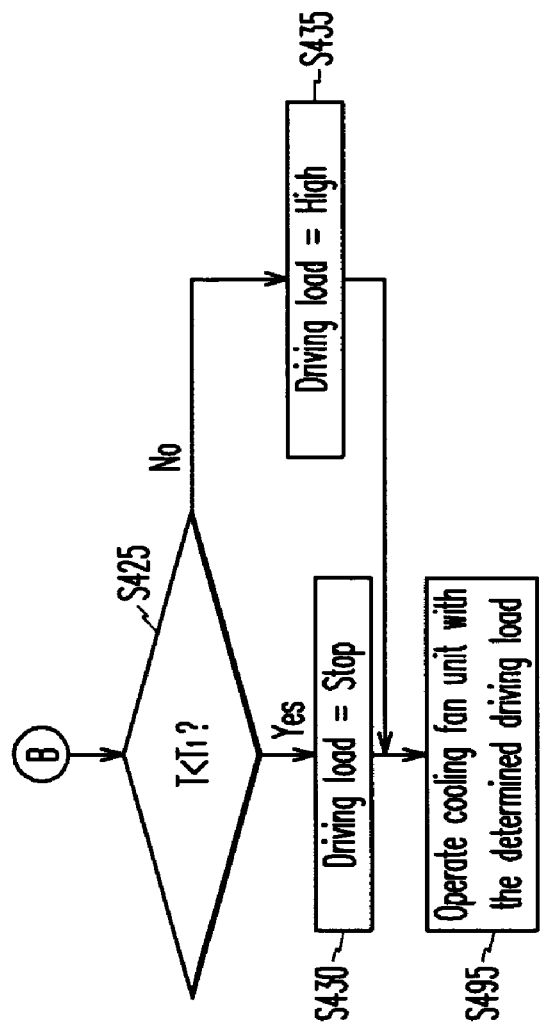
FIG. 3B is a flowchart for showing a process for controlling a cooling fan in a method for controlling a cooling fan of a vehicle according to an embodiment of the present invention, especially when a refrigerant pressure is greater than or equal to a first predetermined pressure.

Hereinafter, processes regarding the case in which the refrigerant pressure P is greater than or equal to the first predetermined pressure P1 at the step S390 are described in detail with reference to FIG. 3B. In this case, an air conditioning system is equipped to a vehicle and the air conditioning system is operated such that the refrigerant pressure P becomes high. That is, the air conditioning system is operated with a high load. In this case, firstly at step S425, the controller 50 determines whether the coolant temperature T is less than the first predetermined temperature T1, and then at step S430, it determines to stop the cooling fan unit 80 in the case in which the coolant temperature T is less than the first predetermined temperature T1.

When the coolant temperature T is not less than the first predetermined temperature T1 at step S325, the controller 50 determines to operate the cooling fan unit 80 with a high load at step S435. When a driving load of the cooling fan unit 80 is determined according to the coolant temperature T and the vehicle speed V at steps S430 and S435, the controller 50 operates the cooling fan unit 80 with such determined driving load at step S495.

Subsequently, the controller 50 proceeds to the step S302, so the controlling state of the cooling fan unit 80 can remain optimal in accordance with a running state of the vehicle even though the running state may change while the vehicle is running.

Hereinafter, processes regarding the case in which the refrigerant pressure P is found to be not greater or equal to the first predetermined pressure P1 at the step S390 (that is, when the refrigerant pressure P is less than the second first predetermined pressure P2) are described in detail with reference to FIG. 3C.

Firstly at step S525, the controller 50 determines whether the coolant temperature T is less than the first predetermined temperature T1, and then at step S530, it determines to stop the cooling fan unit 80 in the case in which the coolant temperature T is less than the first predetermined temperature T1.

When the coolant temperature T is not less than the first predetermined temperature T1 at step S525, the controller 50 determines at step S535 whether the coolant temperature T lies in a range greater than or equal to the first predetermined temperature T1 and less than the third predetermined temperature T3.

When the coolant temperature T lies in the range greater than or equal to the first predetermined temperature T1 and less than the third predetermined temperature T3, the controller 50 determines at step S540 whether the vehicle speed V is greater than or equal to the first predetermined speed V1.

When the vehicle speed V is greater than or equal to the first predetermined speed V1, the controller 50 determines to stop the cooling fan unit 80 at step S545. When the vehicle speed V is less than the first predetermined speed V1, the controller 50 determines to operate the cooling fan unit 80 with a low load at step S550.

Referring back to the step S535, when the coolant temperature T does not lie in the range greater than or equal to the first predetermined temperature T1 and less than the third predetermined temperature T3, i.e., when the coolant temperature T is greater than or equal to the third temperature T3, the controller 50 determines to operate the cooling fan unit 80 with a high load at step S555.

When a driving load of the cooling fan unit 80 is determined according to the coolant temperature T and the vehicle speed V at steps S430, S545, S550, and S555, the controller 50 operates the cooling fan unit 80 with such determined driving load at step S595. Subsequently, the controller 50 proceeds to the step S302, so the controlling state of the cooling fan unit 80 can remain optimal in accordance with a running state of the vehicle even though the running state may change while the vehicle is running.

Hereinafter, processes regarding the air/con switch 40 not being turned on, (i.e., the case in which the air/con switch 40 remains at an off state) are described in detail with reference to FIG. 3D.

Firstly at step S625, the controller 50 determines whether the coolant temperature T is less than the second predetermined temperature T2, and then at step S630, it determines to stop the cooling fan unit 80 in the case in which the coolant temperature T is less than the second predetermined temperature T2.

When the coolant temperature T is not less than the second predetermined temperature T2 at step S625, the controller 50 determines at step S635 whether the coolant temperature T lies in a range greater than or equal to the second predetermined temperature T2 and less than the third predetermined temperature T3.

When the coolant temperature T lies in the range greater than or equal to the second predetermined temperature T2 and less than the third predetermined temperature T3, the controller 50 determines at step S640 whether the vehicle speed V is greater than or equal to the second predetermined speed V2.

When the vehicle speed V is greater than or equal to the second predetermined speed V2, the controller 50 determines to stop the cooling fan unit 80 at step S645. When the vehicle speed V is less than the second predetermined speed V2, the controller 50 determines to operate the cooling fan unit 80 with a low load at step S650.

Referring back to the step S635, when the coolant temperature T does not lie in the range greater than or equal to the second predetermined temperature T2 and less than the third predetermined temperature T3, the controller 50 determines at step S655 whether the coolant temperature T lies in a range greater than or equal to the third predetermined temperature T3 and less than the fourth predetermined temperature T4.

When the coolant temperature T lies in the range greater than or equal to the third predetermined temperature T3 and less than the fourth predetermined temperature T4, the controller 50 determines at step S660 whether the vehicle speed V is greater than or equal to the second predetermined speed V2.

When the vehicle speed V is greater than or equal to the second predetermined speed V2, the controller 50 determines to stop the cooling fan unit 80 at step S665.

When the vehicle speed V is less than the second predetermined speed V2, the controller 50 determines at step S670 whether the vehicle speed V lies in a range greater than or equal to the first predetermined speed V1 and less than the second predetermined speed V2.

When the vehicle speed V lies in the range greater than or equal to the first predetermined speed V1 and less than the second predetermined speed V2, the controller 50 determines to operate the cooling fan unit 80 with a low load at step S675. When the vehicle speed V does not lie in the range greater than or equal to the first predetermined speed V1 and less than the second predetermined speed V2, the controller 50 determines to operate the cooling fan unit 80 with a high load at step S680.

Referring back to the step S655, when the coolant temperature T does not lie in the range greater than or equal to the third predetermined temperature T3 and less than the fourth predetermined temperature T4, that is, when the coolant temperature T is greater than or equal to the fourth predetermined temperature T4, the controller 50 determines to operate the cooling fan unit 80 with a high load at step S685.

When a driving load of the cooling fan unit 80 is determined according to the coolant temperature T and the vehicle speed V at steps S630, S645, S650, S665, S675, S680, and S685, the controller 50 operates the cooling fan unit 80 with such determined driving load at step S695. Subsequently, the controller 50 proceeds to the step S302, so the controlling state of the cooling fan unit 80 can remain optimal in accordance with a running state of the vehicle even though the running state may change while the vehicle is running.

Figure 3E:
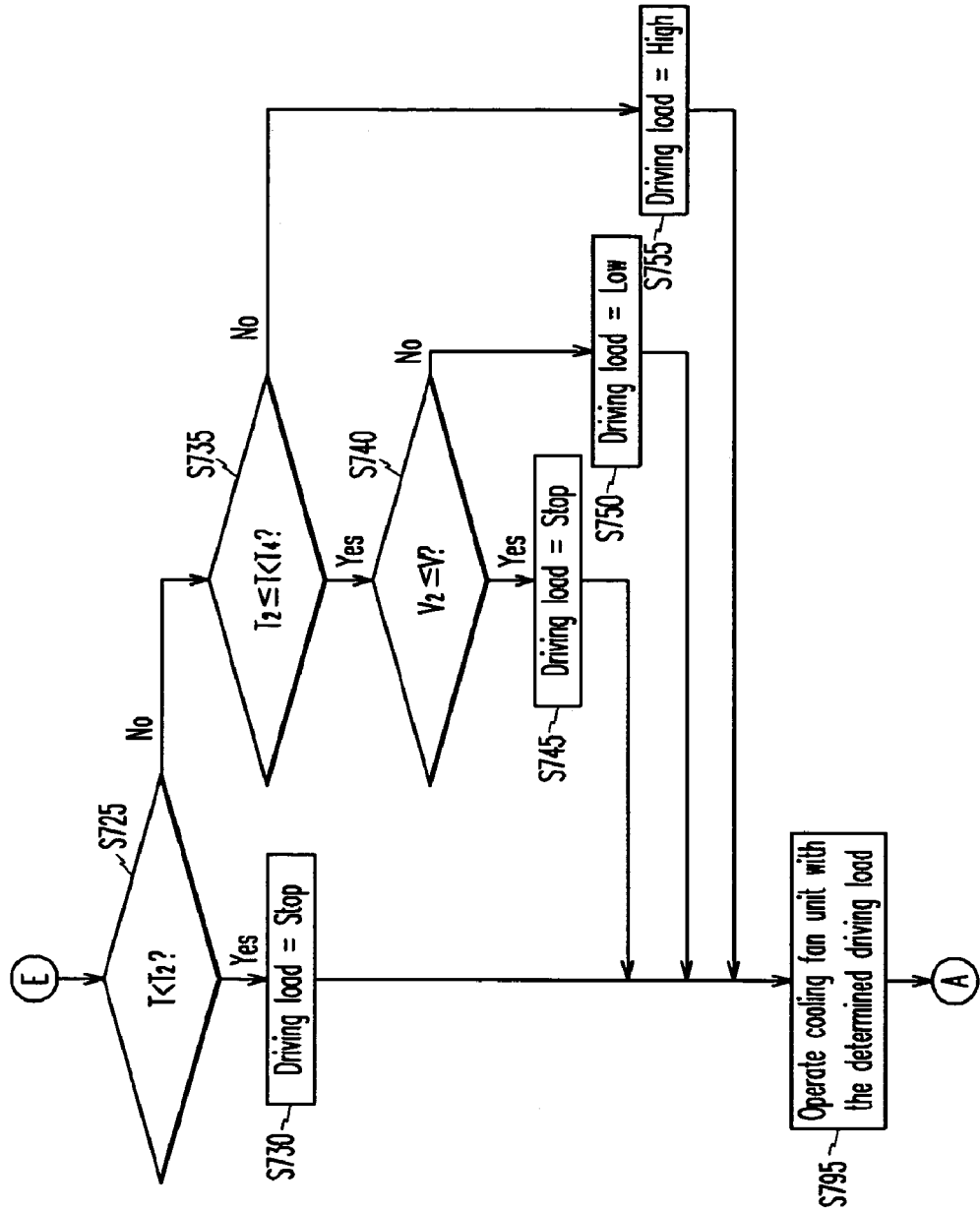
FIG. 3E is a flowchart for showing a process for controlling a cooling fan in a method for controlling a cooling fan of a vehicle according to an embodiment of the present invention, especially when an air conditioning system is not provided in a vehicle.

Hereinafter, processes regarding the case in which the vehicle is not equipped with an air conditioning system are described in detail with reference to FIG. 3E. Firstly at step S725, the controller 50 determines whether the coolant temperature T is less than the second predetermined temperature T2, and then at step S730, it determines to stop the cooling fan unit 80 in the case in which the coolant temperature T is less than the second predetermined temperature T2.

When the coolant temperature T is not less than the second predetermined temperature T2 at step S725, the controller 50 determines at step S735 whether the coolant temperature T lies in a range greater than or equal to the second predetermined temperature T2 and less than the fourth predetermined temperature. T4. When the coolant temperature T lies in the range greater than or equal to the second predetermined temperature T2 and less than the fourth predetermined temperature T4, the controller 50 determines at step S740 whether the vehicle speed V is greater than or equal to the second predetermined speed V2. When the vehicle speed V is greater than or equal to the second predetermined speed V2, the controller 50 determines to stop the cooling fan unit 80 at step S745. When the vehicle speed V is less than the second predetermined speed V2, the controller 50 determines to operate the cooling fan unit 80 with a high load at step S750.

Referring back to the step S735, when the coolant temperature T does not lie in the range greater than or equal to the second predetermined temperature T2 and less than the fourth predetermined temperature T4, the controller 50 determines to operate the cooling fan unit 80 with a high load at step S755.

When a driving load of the cooling fan unit 80 is determined according to the coolant temperature T and the vehicle speed V at steps S730, S745, S750, and S755, the controller 50 operates the cooling fan unit 80 with such determined driving load at step S795. Subsequently, the controller 50 proceeds to the step S302, so the controlling state of the cooling fan unit 80 can remain optimal in accordance with a running state of the vehicle even though the running state may change while the vehicle is running.

Figure 3F:
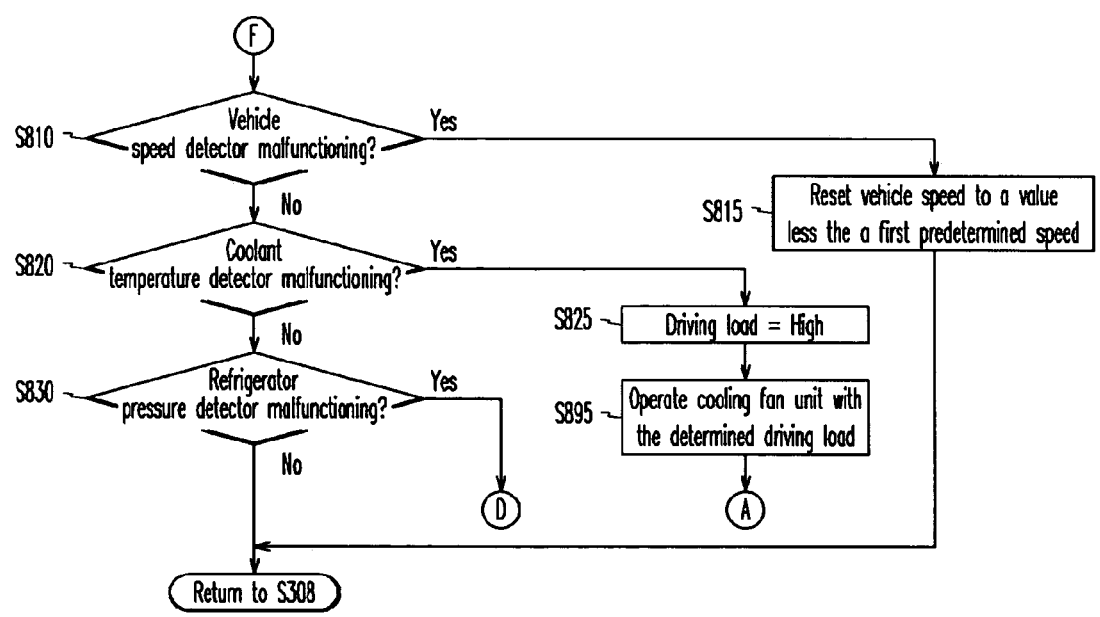
FIG. 3F is a flowchart for showing a process for controlling a cooling fan in a method for controlling a cooling fan of a vehicle according to an embodiment of the present invention, especially when at least one sensor abnormally functions.

Hereinafter, processes regarding the case in which any detector is determined to malfunction at the step S305 are described in detail with reference to FIG. 3F. When any detector of the detectors 10, 20, and 30 is determined to malfunction at step S305, the controller 50 determines at step S810 whether it is the vehicle speed detector 10 that malfunctions.

The step S810 implies that the controller 50 determines whether the detected vehicle speed V is abnormal. The malfunction of the vehicle speed detector 10 and the abnormality of the detected vehicle speed V may be determined on the basis of whether the detected vehicle speed V lies within a predetermined normal speed range. When the vehicle speed detector 10 is found to malfunction, the controller 50 supposes and sets the vehicle speed V as a value (e.g., 40 Km/h) less than the first predetermined speed V1 at step S815 and proceeds to the subsequent step S308.

When the vehicle speed detector 10 does not malfunction, the controller 50 determines at step S820 whether it is the coolant temperature detector 20 that malfunctions. The step S820 implies that the controller 50 determines whether the detected coolant temperature T is abnormal. The malfunction of the coolant temperature detector 20 and the abnormality of the detected coolant temperature T may be determined on the basis of whether the detected coolant temperature T lies within a predetermined normal temperature range.

When the coolant temperature detector 20 is found to malfunction, the controller 50 determines to operate the cooling fan unit 80 with a high load at step S825, and then the controller 50 operates the cooling fan unit 80 with a high load at step S895. Subsequently, the controller 50 proceeds to the step S302, so the controlling state of the cooling fan unit 80 can remain optimal in accordance with a running state of the vehicle even though the running state may change while the vehicle is running.

When the coolant temperature detector 20 does not malfunction, the controller 50 determines at step S830 whether it is the refrigerant pressure detector 30 that malfunctions.

The step S820 implies that the controller 50 determines whether the detected refrigerant pressure P is abnormal. The malfunction of the refrigerant pressure detector 30 and the abnormality of the detected refrigerant pressure P may be determined on the basis of whether the detected refrigerant pressure P lies within a predetermined normal pressure range.

When the refrigerant pressure detector 30 is found to malfunction, the controller 50 controls the cooling fan unit 80 the same as when the air/con switch 40 is turned off, so the control process proceeds to a node D (refer to FIG. 3D). If the refrigerant pressure detector 30 does not malfunction, the controller 50 proceeds to the step S308.

As described above, according to an embodiment of the present invention, one or more cooling fans of a vehicle are optimally controlled on the basis of a variety of vehicle parameters such as the coolant temperature T, the vehicle speed V, and the refrigerant pressure P, and therefore, more stable operation of an engine and more stable running of a vehicle are achieved at a variety of running circumstances of the vehicle. Furthermore, even if one or more detectors are malfunctioning, the cooling fans are still appropriately controlled.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling a cooling fan unit of a vehicle, the cooling fan unit including at least one cooling fan, the method comprising:
   detecting a plurality of vehicle parameters including a coolant temperature and a vehicle speed;
   determining a driving load of the cooling fan unit corresponding to the vehicle parameters on the basis of a plurality of temperature ranges of the coolant temperature and a plurality of speed ranges of the vehicle speed,
      the plurality of temperature ranges formed by at least one reference temperature selected from a plurality of predetermined temperatures,
      the plurality of speed ranges formed by at least one reference speed selected from a plurality of predetermined speeds, and
      the driving load being selectively determined from a plurality of predetermined loads; and
   operating the cooling fan unit at the determined driving load, wherein:
   the vehicle is equipped with an air conditioning system including an air/con switch;
   the at least one reference temperature and the at least one reference speed are selected on the basis of an on/off state of the air/con switch; and
   in the case in which the air/con switch is off, the driving load of the cooling fan unit is determined as:
   a smallest one of the predetermined loads when the coolant temperature lies in a first temperature range less than a first reference temperature;
   a load depending on comparison of the vehicle speed and a first reference speed when the coolant temperature lies in a second temperature range greater than or equal to the first reference temperature and less than a second reference temperature;
   a load depending on comparison of the vehicle speed and a second reference speed when the coolant temperature lies in a third temperature range greater than or equal to the second reference temperature and less than a third reference temperature; and
   a largest one of the predetermined loads when the coolant temperature lies in a fourth temperature range greater than or equal to the third reference temperature.

2. The method of claim 1, wherein:
   the first reference temperature is less than 100° C.; and
   the second reference temperature and the third reference temperature are greater than 100° C.

3. The method of claim 1, wherein the first reference speed is smaller than the second reference speed.

4. A method for controlling a cooling fan unit of a vehicle, the cooling fan unit including at least one cooling fan, the method comprising:
   detecting a plurality of vehicle parameters including a coolant temperature and a vehicle speed;
   determining a driving load of the cooling fan unit corresponding to the vehicle parameters on the basis of a plurality of temperature ranges of the coolant temperature and a plurality of speed ranges of the vehicle speed,
      the plurality of temperature ranges formed by at least one reference temperature selected from a plurality of predetermined temperatures,
      the plurality of speed ranges formed by at least one reference speed selected from a plurality of predetermined speeds, and
      the driving load being selectively determined from a plurality of predetermined loads; and
   operating the cooling fan unit at the determined driving load, wherein:
   the vehicle is equipped with an air conditioning system including an air/con switch;
   the at least one reference temperature and the at least one reference speed are selected on the basis of an on/off state of the air/con switch and a refrigerant pressure in the air conditioning system; and
   in the case in which the air/con switch is on and the refrigerant pressure lies in a range less than a first predetermined pressure and greater than or equal to a second predetermined pressure, the driving load of the cooling fan unit is determined as:
   a smallest one of the predetermined loads when the coolant temperature lies in a first temperature range less than a first reference temperature;
   a load depending on comparison of the vehicle speed and a first reference speed when the coolant temperature lies in a second temperature range greater than or equal to the first reference temperature and less than a second reference temperature;
   a load depending on comparison of the vehicle speed and a second reference speed when the coolant temperature lies in a third temperature range greater than or equal to the second reference temperature and less than a third reference temperature; and
   a largest one of the predetermined loads when the coolant temperature lies in a fourth temperature range greater than or equal to the third reference temperature.

5. The method of claim 4, wherein:
the first reference temperature is less than 0° C.;
the second reference temperature is greater than or equal to 0° C. and less than 100° C.; and
the third reference temperature is greater than 100° C.

6. The method of claim 4, wherein the first reference speed is greater than the second reference speed.

7. A method for controlling a cooling fan unit of a vehicle, the cooling fan unit including at least one cooling fan, the method comprising:
   detecting a plurality of vehicle parameters including a coolant temperature and a vehicle speed;
   determining a driving load of the cooling fan unit corresponding to the vehicle parameters on the basis of a plurality of temperature ranges of the coolant temperature and a plurality of speed ranges of the vehicle speed,
       the plurality of temperature ranges formed by at least one reference temperature selected from a plurality of predetermined temperatures,
       the plurality of speed ranges formed by at least one reference speed selected from a plurality of predetermined speeds, and
       the driving load being selectively determined from a plurality of predetermined loads; and
   operating the cooling fan unit at the determined driving load, wherein:
   the vehicle is equipped with an air conditioning system including an air/con switch;
   the at least one reference temperature and the at least one reference speed are selected on the basis of an on/off state of the air/con switch and a refrigerant pressure in the air conditioning system; and
   in the case in which the air/con switch is on and the refrigerant pressure is less than a predetermined pressure, the driving load of the cooling fan unit is determined as:
   a smallest one of the predetermined loads when the coolant temperature lies in a first temperature range less than a first reference temperature;
   a load depending on comparison of the vehicle speed and a first reference speed when the coolant temperature lies in a second temperature range greater than or equal to the first reference temperature and less than a second reference temperature; and
   a largest one of the predetermined loads when the coolant temperature lies in a third temperature range greater than or equal to the second reference temperature.

8. The method of claim 7, wherein:
the first reference temperature is less than 0° C.; and
the second reference temperature is greater than 100° C.

9. A method for controlling a cooling fan unit of a vehicle, the cooling fan unit including at least one cooling fan, the method comprising:
   detecting a plurality of vehicle parameters including a coolant temperature and a vehicle speed;
   determining a driving load of the cooling fan unit corresponding to the vehicle parameters on the basis of a plurality of temperature ranges of the coolant temperature and a plurality of speed ranges of the vehicle speed,
       the plurality of temperature ranges formed by at least one reference temperature selected from a plurality of predetermined temperatures,
       the plurality of speed ranges formed by at least one reference speed selected from a plurality of predetermined speeds, and
       the driving load being selectively determined from a plurality of predetermined loads; and
   operating the cooling fan unit at the determined driving load, wherein:
   the vehicle is equipped with an air conditioning system including an air/con switch;
   the at least one reference temperature and the at least one reference speed are selected on the basis of an on/off state of the air/con switch and a refrigerant pressure in the air conditioning system; and
   in the case in which the air/con switch is on and the refrigerant pressure is greater than or equal to a predetermined pressure, the driving load of the cooling fan unit is determined as:
   a smallest one of the predetermined loads when the coolant temperature is less than a first reference temperature; and
   a largest one of the predetermined loads when the coolant temperature is greater than or equal to the first reference temperature.

10. The method of claim 9, wherein the reference temperature is less than 0° C.

11. A method for controlling a cooling fan unit of a vehicle, the cooling fan unit including at least one cooling fan, the method comprising:
    detecting a plurality of vehicle parameters including a coolant temperature and a vehicle speed;
    determining a driving load of the cooling fan unit corresponding to the vehicle parameters on the basis of a plurality of temperature ranges of the coolant temperature and a plurality of speed ranges of the vehicle speed,
        the plurality of temperature ranges formed by at least one reference temperature selected from a plurality of predetermined temperatures,
        the plurality of speed ranges formed by at least one reference speed selected from a plurality of predetermined speeds, and
        the driving load being selectively determined from a plurality of predetermined loads; and
    operating the cooling fan unit at the determined driving load, wherein:
    the at least one reference temperature and the at least one reference speed are selected on the basis of whether the vehicle is equipped with an air conditioning system; and
    in the case in which the vehicle is not equipped with an air conditioning system, the driving load of the cooling fan unit is determined as:
    a smallest one of the predetermined loads when the coolant temperature lies in a first temperature range less than a first reference temperature;
    a load depending on comparison of the vehicle speed and a first reference speed when the coolant temperature lies in a second temperature range greater than or equal to the first reference temperature and less than a second reference temperature; and
    a largest one of the predetermined loads when the coolant temperature lies in a third temperature range greater than or equal to the second reference temperature.

12. A method for controlling a cooling fan unit of a vehicle, the cooling fan unit including at least one cooling fan, the method comprising:
    detecting a plurality of vehicle parameters including a coolant temperature and a vehicle speed;
    determining a driving load of the cooling fan unit corresponding to the vehicle parameters on the basis of a plurality of temperature ranges of the coolant temperature and a plurality of speed ranges of the vehicle speed, the plurality of temperature ranges formed by at least one reference temperature selected from a plurality of predetermined temperatures, the plurality of speed ranges formed by at least one reference speed selected from a plurality of predetermined speeds, and the driving load being selectively determined from a plurality of predetermined loads;

operating the cooling fan unit at the determined driving load; and determining whether a detected vehicle parameter is abnormal, wherein the driving load of the cooling fan unit is determined on the basis of whether a vehicle parameter is abnormal and which vehicle parameter is abnormal.

13. The method of claim 12, wherein, in the case in which the vehicle speed is abnormal, the determining the driving load of the cooling fan unit determines the driving load using a value less than the first predetermined speed as the vehicle speed.

14. The method of claim 12, wherein, in the case in which the coolant temperature is abnormal, the determining the driving load of the cooling fan unit determines the driving load as the largest one of the predetermined loads.

15. The method of claim 12, wherein the vehicle is equipped with an air conditioning system including an air/con switch and the vehicle parameter further comprises a refrigerant pressure of the air conditioning system, wherein, in the case in which the refrigerant pressure is abnormal, the determining the driving load of the cooling fan unit determines the driving load as:

a smallest one of the predetermined loads when the coolant temperature lies in a first temperature range less than a first reference temperature;

a load depending on comparison of the vehicle speed and a first reference speed when the coolant temperature lies in a second temperature range greater than or equal to the first reference temperature and less than a second reference temperature;

a load depending on comparison of the vehicle speed and a second reference speed when the coolant temperature lies in a third temperature range greater than or equal to the second reference temperature and less than a third reference temperature; and a largest one of the predetermined loads when the coolant temperature lies in a fourth temperature range greater than or equal to the third reference temperature.

* * * * *